United States Patent
Hemauer et al.

[11] Patent Number: 6,041,738
[45] Date of Patent: Mar. 28, 2000

[54] FISH POND METHODS AND SYSTEMS

[75] Inventors: Thomas Joseph Hemauer; Daniel John Niquette, both of Chilton, Wis.

[73] Assignee: Fun Fishing LLC., Chilton, Wis.

[21] Appl. No.: 08/879,466

[22] Filed: Jun. 20, 1997

[51] Int. Cl.$^7$ ............................ A01K 63/00; A01K 63/04
[52] U.S. Cl. ............................................. 119/226; 119/227
[58] Field of Search ................................... 119/226, 227, 119/228, 229

[56] References Cited

U.S. PATENT DOCUMENTS

| | | | |
|---|---|---|---|
| 1,393,339 | 10/1921 | Benton | 119/224 |
| 3,116,712 | 1/1964 | Ogden et al. | 119/226 |
| 3,566,839 | 3/1971 | Hilble | 119/224 |
| 3,863,605 | 2/1975 | Gallup | 119/229 |
| 4,003,337 | 1/1977 | Moore | 119/224 |
| 4,211,183 | 7/1980 | Hoult | 119/227 |
| 4,323,032 | 4/1982 | Halfon | 119/248 |
| 4,516,528 | 5/1985 | Jones | 119/226 |
| 5,154,136 | 10/1992 | Harvey | 119/228 |
| 5,207,424 | 5/1993 | Bleam et al. | 273/140 |
| 5,290,437 | 3/1994 | Lin | 119/226 |
| 5,340,120 | 8/1994 | Holyoak | 273/447 |
| 5,584,991 | 12/1996 | Wittsock et al. | 119/227 |
| 5,660,142 | 8/1997 | Van Rijn | 119/226 |

OTHER PUBLICATIONS

Michael F. Schwartz and Claude E. Boyd; The use of constructed wetlands to treat aquacultural effluents; Dec. 1995; pp. 42–44.

Primary Examiner—Peter M. Poon
Assistant Examiner—Elizabeth Shaw
Attorney, Agent, or Firm—Thomas D. Wilhelm; Brian R. Tumm

[57] ABSTRACT

This invention pertains to a fish pond system for use as a fish pond amusement park. The fish pond system includes a fish pond having at least one fish container in a deeper, typically a central region, and a pond liner extending outwardly from the fish container, preferably inclined at a generally upward angle, preferably less than 10 degrees. The pond has a shallower zone having a depth of at least about 7 inches at the juncture of the central region and the shallower zone. The fish container has greater depth than the shallower zone such that fish congregate in the fish container. The fish pond system preferably includes a water recirculation system receiving water from the bottom of the fish container, passing the water through a settling container, typically a settling pond, and returning the water to the fish pond. Fish waste solids settle to the bottom of the settling pond, and are removed to a decomposition pond within the fish pond system, where the fish wastes are biologically decomposed by plants. The fish pond system preferably includes an aerator controlling oxygen in the water, and water plants removing nitrates and phosphates from the water. An optional biofilter supports bacteria that convert ammonia in the water to nitrite and then to nitrate. Thus the fish pond system generates substantially no waste for off-site transport for disposal or treatment away from the area of the fish pond system.

61 Claims, 3 Drawing Sheets

FISH POND METHODS AND SYSTEMS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND

This invention relates to fish pond systems and to methods of operating fish pond systems. Prior art fish ponds are known in the art for displaying fish for the enjoyment of viewers. Some such fish ponds have multiple depths permitting fish a choice of various depth locations.

Some conventional fish farming systems disclose recirculating heated or cooled water to the fish tanks, and periodically moving fish from tank-to-tank in order to maintain the fish at each stage of growth in tanks sized to encourage continued growth of the fish. Such systems can include aerators to aerate water.

It is an object of this invention to provide a fish pond, including a fish pond system, suitable for maintaining healthy fish therein, and which fish pond system generates substantially no waste for off-site transport for disposal treatment away from the fish pond system.

It is another object of the invention to provide such a fish pond system which, by its structural design, reduces risk of water-based injury to patrons thereof.

It yet another object to provide such a fish pond system having controlled risk of injury to fish caught from the pond and subsequently returned to the pond.

It is a further object to provide such a fish pond system including biological elements for controlling ammonia and ammonia compounds, nitrites, nitrates, pH, dissolved oxygen, suspended solids, dissolved solids, and phosphorous compounds in the water at levels suitable for maintaining a healthy fish population in the pond.

SUMMARY

Fish pond systems of the invention can be operated as fishing amusement parks. The amusement parks comprise generally self-contained fish pond systems used for maintaining and catching fish, and subsequently releasing the caught fish back to the pond. The amusement parks are self-contained in the sense that they generate substantially no requirement for transport of fish waste solids off-site for treatment thereof away from the amusement parks.

As used herein, "fish" waste solids generally refers to excrement and other exudates from fish, uneaten food, bait, or bones and other parts of deceased fish.

Some of the objects of the invention are obtained in a first family of embodiments wherein a fish pond has a relatively deeper central region, a relatively shallower outer zone extending outwardly about the central region, a pond liner extending outwardly from the central region and underlying preferably the entirety of the outer zone, the pond liner preferably being inclined at a generally upward angle away from the central region. At least one fish container is located in the central region, the fish container having a bottom and a top. The fish container cooperates with, and is preferably secured to, the pond liner, preferably at a joint extending about the fish container such that water cannot leak through the joint.

The top of the fish container is preferably at substantially the same depth as the pond liner at the locus of meeting of the central region and the outer zone. The bottom of the at least one fish container has a depth greater than the depth in the outer zone such that fish congregate in the fish container. The shallower depth at the outer zone enables operating the fish pond with a reduced amount of water, and reduces risk of water-based injury to a user of the fish pond.

The fish pond preferably has a depth of at least 7 inches, preferably no more than 12 inches, in the central region propinquant the top of the fish container. The depth preferably decreases with distance from the juncture of the fish container and the outer zone. Fish in the pond tend to move toward increasing depth of water during daylight hours, thereby moving toward the fish container, and thus congregating at the greater depth inside the fish container.

Other objects of the invention are obtained in outdoor fish pond systems, comprising at least one fish pond including a water recirculation system, the water recirculation system including a recirculation transport assembly connected in liquid-tight communication to the bottom of a fish container. The water recirculation system receives recirculation water from the fish container, cleans the water, and returns the cleaned water to the fish pond. The fish pond system preferably generates substantially no waste for off-site transport for disposal or treatment away from the outdoor fish system.

Still other objects of the invention are obtained in a fish pond system comprising first and second fish ponds having respective first and second fish containers at respective central regions thereof, and a filtration system disposed between the first and second fish ponds, such that water passes from the first fish pond through the filtration system to the second fish pond.

Yet other objects of the invention are obtained in methods of operating an outdoor closed-loop fish pond system including at least one fish pond having a fish container disposed in a central region of the fish pond. The methods include receiving water from a bottom end of the fish container and transporting the water so received to a settling pond, waste solids settling to the bottom of the settling pond, passing the thus clarified water from the settling pond into the at least one fish pond, and periodically or continuously removing the waste solids from the settling pond and depositing the waste in a decomposition pond.

Still further objects are obtained in a method of operating a live fish catching game utilizing a fish pond system. The method includes the steps of providing a fish pond having a relatively deeper central region and a relatively shallower outer zone extending outwardly from the central region, and providing at least one fish container in the central region of the fish pond. The fish container defines the relatively deeper depth of the central region. The method further provides at least two fish-catching pads adjacent the outer edge of the fish pond, each fish catching pad preferably having comminuted bark having typical nominal size of about 1 inch to about 2 inches. The bark provides a walking and standing surface, and minimizes injury to fish that are landed thereon. The method further includes providing fishing poles for use of patrons at each of the at least two fish-catching pads, the fishing poles being long enough to facilitate reaching the fish container from each of the respective pads but not so long as to facilitate snagging or otherwise contacting fishing poles being utilized at other fish-catching pads.

Figure 1:
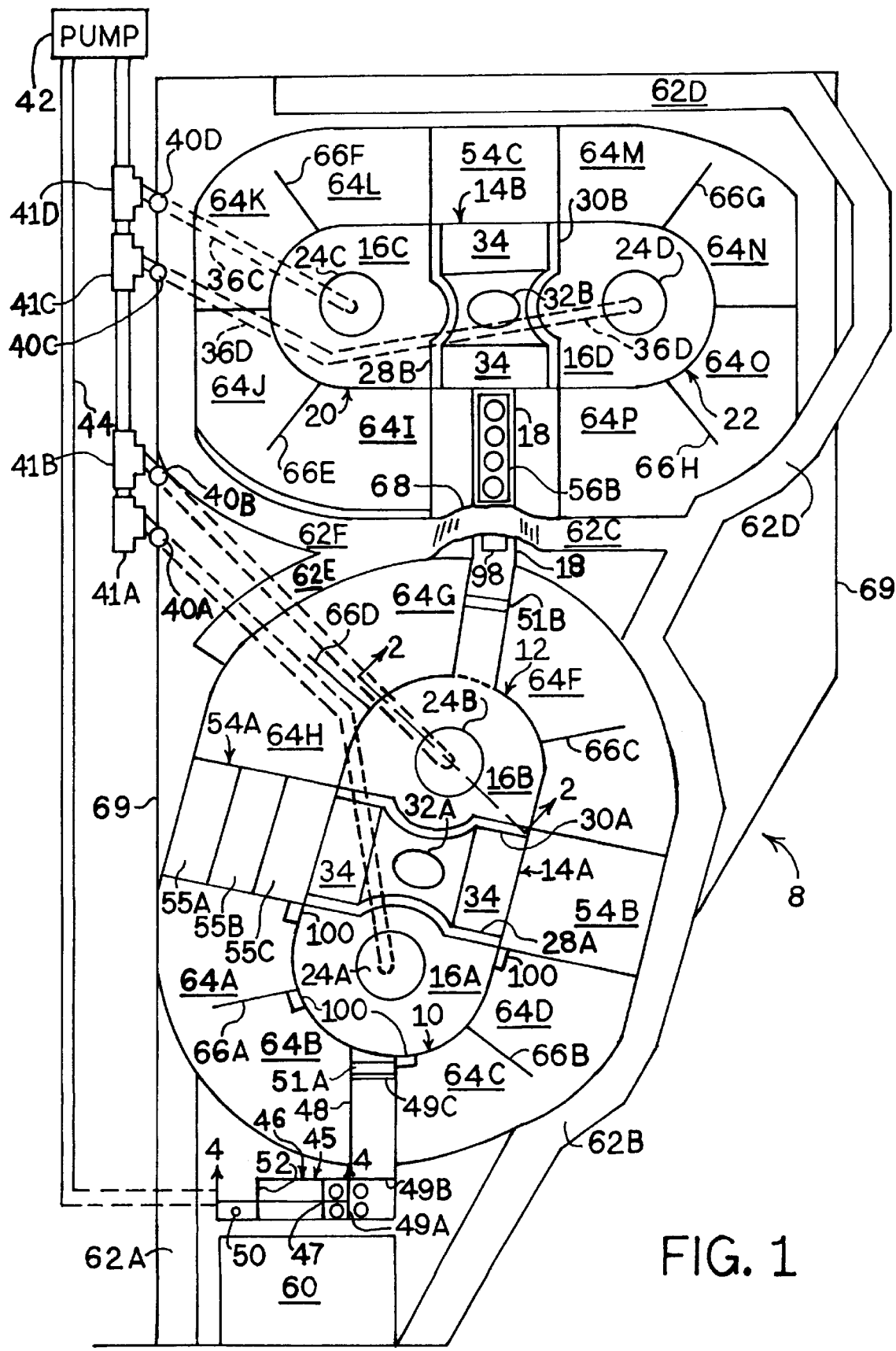
FIG. 1 shows a representative top view of a first embodiment of a fish pond system of the invention, without water therein.

The invention is not limited in its application to the details of construction and the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Referring now by characters of reference to the drawings, and first to FIG. 1, a fish pond system 8 is shown having a first fish pond 10 and a second fish pond 12. A filtration system 14A is located between first and second fish ponds 10, 12. A first pond liner 16A and a second pond liner 16B form the respective bottom water-containment elements of first and second fish ponds 10, 12. A first chute 18 carries water from second fish pond 12 to third fish pond 20 and fourth fish pond 22, respectively. Pond liners 16C, 16D form the respective bottom water-containment elements of the third and fourth fish ponds 20, 22.

Each respective fish pond has a fish container 24A–24D located substantially in the center of the respective pond. Fish in the ponds tend to move toward the deeper water during daylight conditions, and thus tend to congregate in the respective fish containers 24 at central regions 25 (See FIG. 2) in each of the ponds because of the greater depths at the central regions than at outer zones 26 which surround the fish containers.

Filtration system 14A between the first and second ponds 10, 12 includes fish barriers 28A, 30A which impede fish attempting to enter filtration system 14A from first pond 10 or from second fish pond 12, respectively. Likewise, a second filtration system 14B, shown in FIG. 1 between the third and fourth ponds 20, 22, includes fish barriers 28B, 30B which impede fish attempting to enter filtration system 14B from third fish pond 20 or from fourth fish pond 22.

Aerator 32A aerates water for first and second fish ponds 10, 12. Likewise aerator 32B aerates water for third and fourth fish ponds 20, 22. Water plants illustrated at locations 34 are part of filtration systems 14A, 14B which are disposed between fish barriers 28A, 28B. Recirculation pipes 36A–36D are buried underground (See FIG. 2), and lead from respective fish containers 24A–24D to manifold collection pipe 38 illustrated as being above ground. Each recirculation pipe 36A–36D has a valve 40A–40D for individual control of each respective recirculation pipe. Connectors 41A–41D connect the respective buried recirculation pipes to manifold collection pipe 38. Manifold collection pipe 38 conveys the drained water to recirculation pump 42. Pump 42 pumps the water through discharge pipe 44, to a clarifier system 45. Clarifier system 45 includes a settling pond 46, coarse filter 47, clarifier water chute 48, and fine filters 49A–49C. Settling pond 46 discharges water through clarifier chute 48, through fish barrier 51A, and into first pond 10 thus completing the recirculation of water from a given fish pond through the recirculating system, and back into a fish pond.

A submersible pump 50 is located at deeper section 52. Pump 50 periodically pumps fish wastes settled in the bottom of settling pond 46 through a flexible hose or other conduit (not shown) to selected decomposition ponds 54A–54C. While a submersible pump 50 is illustrated, a vacuum pump could be utilized to pump fish wastes from settling pond 46.

Still referring to FIG. 1, office 60 at an entrance end of pond system 8 facilitates receiving patrons into the pond system, also referred to herein as a fishing amusement park. Walkways 62A–62F provide pathways for patrons to traverse in order to reach respective fish-catching pads 64A–64P. Fish-catching pads 64A–64P preferably are separated by dividing walls 66A–66H to provide adequate separation of patrons at respective pads. Bridge 68 connects walkways 62C and 62F. Fence 69 surrounds substantially the entire fish pond system 8, optionally excepting pump 42 and pipes 38, 44.

Addressing a more detailed description of certain ones of the elements, and referring still to FIG. 1, fish pond system 8 includes four fish ponds 10, 12, 20, 22. Fish pond system 8 can include any desired number of fish ponds, such as, for example, one fish pond, six fish ponds, eight fish ponds, or any other number of ponds. If more than six fish ponds are utilized, it is preferred that multiple independent fish pond systems be built so as to better isolate disease which may attack fish, whereby any unaffected fish pond systems may remain in operation while one or more other systems are being treated for the disease.

Fish ponds 10, 12 and filtration system 14A, in combination, are shown having a generally elliptical shape. In such embodiment, the major axis of the ellipse preferably has a length of from about 24 feet to about 35 feet and the minor axis preferably has a length of from about 10 feet to about 20 feet. In another embodiment, an individual fish pond can have a substantially rectangular shape including a preferred length of from about 15 feet to about 21 feet and a preferred width of from about 12 feet to about 18 feet.

Figure 2:
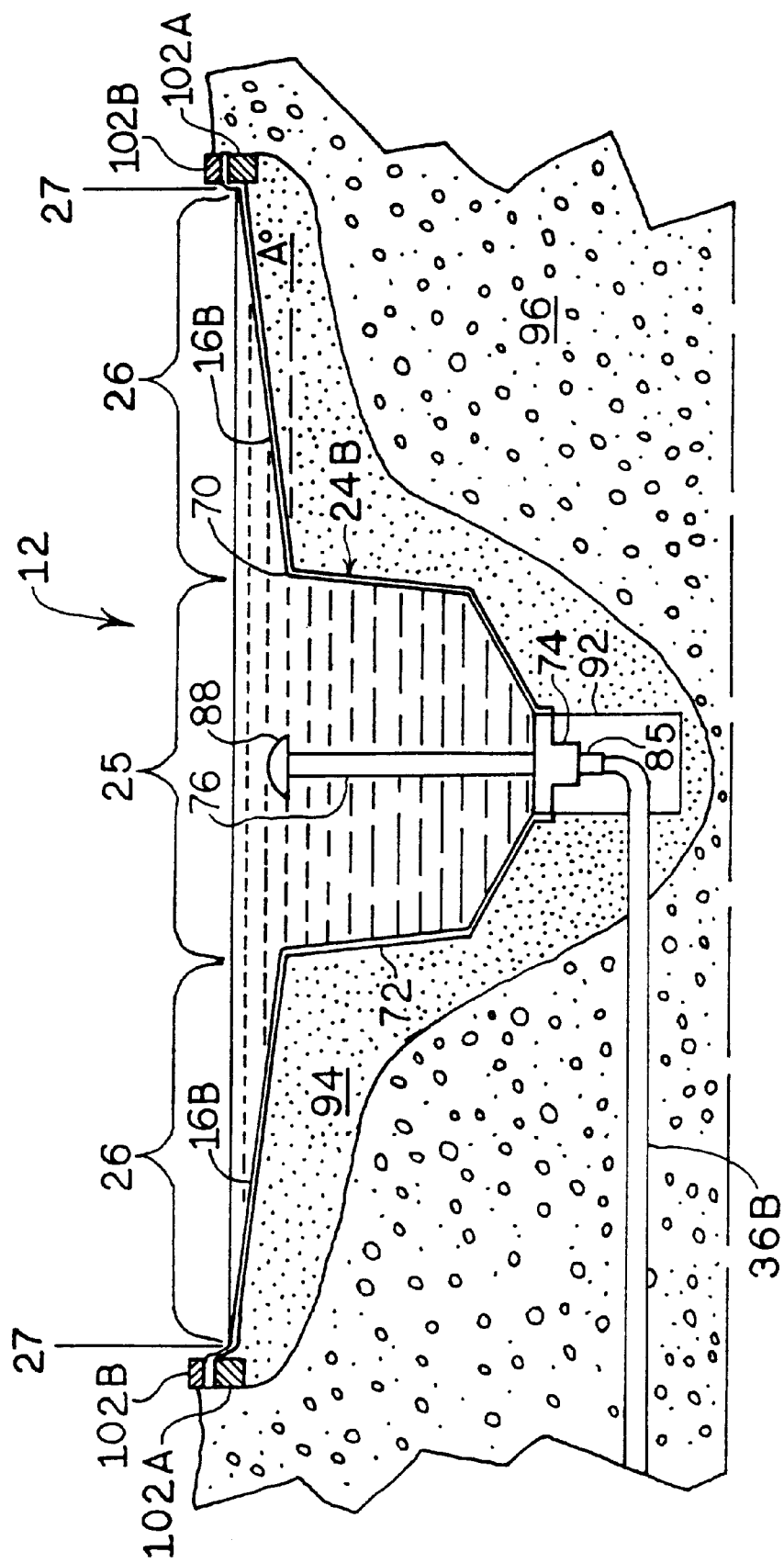
FIG. 2 shows a representative cross section view of a fish pond of the invention taken at 2—2 of FIG. 1, with water therein.

As better shown in FIG. 2, fish pond 12 comprises an in-ground, outdoor fish pond having a relatively deeper central region 25 substantially corresponding to fish container 24B, and a relatively shallower outer zone 26 corresponding to pond liner 16B. Pond liner 16B extends outwardly from central region 25 at a generally upward angle away from the central region. This upward angle "A" (FIG. 2) preferably is less than 10 degrees with respect to the horizontal.

A small angle is advantageous because the amount of water requiring recirculation and treatments is reduced substantially by the shallower average depth which is thus possible in outer zone 26. Further, water in outer zone 26 gives the illusion of fishing in a large pond, while the fish are concentrated in container 24B. The small angle is also advantageous because fish are attracted to deeper water, especially during daylight hours. Thus fish which may be in outer zone 26 during daylight hours tend to move toward central region 25, and to congregate and remain inside fish container 24B during daylight. Having a level bottom at outer zone 26, or having too large an angle, may result in some fish loitering at locations in outer zone 26. Further, the gently sloped angle reduces the risk of water-based injury to a user of the fish pond unable to swim. For example, if a child should fall into the water at outer zone 26, the water is so shallow that risk of drowning or the like is very small.

Since one of the factors causing the fish to remain in the fish container is the relative amount of light, fish may naturally come out of the fish container during the night to forage in the shallower water of outer zone 26, but will again return to the deeper water upon arrival of daylight the following day.

Thus, the fish tend to daily congregate in the desired location (the fish container) during those hours when an amusement business would normally be open for patronage (namely the daylight hours). If the business is to be operated at night, high levels of lighting should be used at least at pads 64 in order that patrons have sufficient lighting for removing and otherwise manipulating hooks. Since the fish respond to light, such lighting might be sufficient to cause the fish to remain in the fish container, or if the fish come out of the fish container, to cause the fish to move back into the fish container. If lighting on pads 64 is not sufficient to cause the fish to return to the fish container, additional lighting directly on the pond does effectively cause the fish to return to the fish container.

Less water per inch of surface is present in fish pond 10 than in conventional ponds because of the shallow depth at outer zone 26 away from fish container 24B. Therefore, water treatments to maintain desired chemical balance in the water can be satisfied with use of correspondingly lower amounts of such water treatment chemicals, whereby fish pond system 8 is more economical to maintain and places less resource demand on raw materials. Fish pond system 8 as illustrated, generally is operated with less than 5000 gallons of water for each two fish ponds, for example first and second fish ponds 10, 12. A preferred and operable amount of water for each two ponds, including a corresponding fraction of the recirculation system, is about 4000 gallons.

Fish ponds 10, 20, and 22 have essentially the same layout as shown in FIG. 2 for fish pond 12, except that the respective buried recirculation pipe 36 may project outwardly in a different direction toward manifold collection pipe 38.

Thus in preferred embodiments, fish pond 12 has a depth of between about 2 inches and about 8 inches at outer edge 27 of outer zone 26 of the fish pond, and has a depth of between about 5 inches and about 12 inches at joint 70 where pond liner 16B joins fish container 24B, namely at the juncture of outer zone 26 with central region 25. Most preferably, fish pond 12 has a depth of at least about 6 inches at outer edge 27. Such a minimum depth prevents nocturnal predatory animals from chasing fish and thus causing fish to jump out of fish pond 12, or catching fish that forage at night in the shallow water outside of fish container 24B. No matter what depths are selected, the depth at joint 70 must always be greater than the depth at outer edge 27. As illustrated, the top of fish container 24B has substantially the same depth as pond liner 16B at the juncture of central region 25 and outer zone 26.

An adhesive or other sealant (not shown) secures respective pond liners 16A–16D to respective fish containers 24A–24D at joint 70 as illustrated in FIG. 2. Joint 70 provides a water-tight securement of the top of fish container 24B to pond liner 16B, and extends about the outer perimeter of fish container 24B, and a corresponding perimeter of a respectively-sized aperture in pond liner 16B. Other known methods of sealing pond liner 16 to fish container 24 are within the scope of the invention.

Pond liners 16A–16D preferably comprise impermeable plastic or plastic-type film or sheet material, such as swimming pool liner material. Other suitable plastics can also be utilized. Material such as cement or clay can be used as the pond liner, although such materials are less preferred. For example, impermeable clay, such as bentonite, may be used, as can cement in combination with a suitable water barrier coating thereon. Thus, the expression "pond liner" as used here and in the claims which follow, and especially with respect to the fish ponds, includes the plastic products, cement, and clay, and like materials which are suitably impermeable to water. With respect to settling pond 46, "pond liner" refers specifically to fabricated sheet-like materials, typically plastic sheeting, and does not include inorganic materials such as clay, cement, bentonite, and the like.

In an alternate embodiment, similar to FIG. 1, pond liners 16A, 16B comprise a single unitary liner sheet (e.g. plastic) having apertures where needed for securement of fish containers 24A, 24B and for providing openings to the respective deeper regions 25 corresponding to substantially the full diameters of the tops of the respective fish containers. In this embodiment, the single pond liner also extends across filtration system 14A as a liner therefor.

Further, each pond liner 16 can comprise multiple liners or liner elements adhesively or otherwise secured to each other.

In the preferred embodiment, fish containers 24A–24D comprise round tanks having downwardly-extending conical bottoms as illustrated in FIG. 2. Such tanks are available in suitable sizes from Polytank Inc. of Litchfield, Minn. Fish containers 24A–24D can comprise rigid fiberglass-embedded resin material, a substantially rigid plastic material, or any other material having suitable characteristics including impermeability to water and suitable rigidity and durability.

In one embodiment, the tank has a depth of about 40 inches from the top to the bottom thereof at the apex of the downwardly-extending cone such that the overall depth of the fish pond is about 52 inches at the center of the fish container. The fish container preferably has a greater diameter at the top than the at the bottom. In preferred fish containers, the top has an open area corresponding to a diameter of from about 72 inches to about 78 inches, and the bottom has a cross-sectional area at the base of side wall 72 corresponding to a diameter of from about 62 inches to about 68 inches. As suggested here, the fish containers need not be round. Other shapes can be used, though corners are not preferred because of uneven distribution of fish in containers which have corners.

The bottom of the fish container illustrated in the drawings has a conical shape, including a circular base to the cone; and the top has a generally circular shape. The circular shape is preferred at the base of the inverted bottom cone because the fish congregate more uniformly where the shape is circular. For example, in a tank having a square-shaped bottom, the fish tend to congregate more in the corners.

Sidewall 72 of fish container 24B preferably extends downwardly about 30 inches from the top. Beginning at the lowest reach of the bottom of the fish container, the bottom preferably progresses upwardly toward the bottom of the sidewall at an angle of about 20 degrees with respect to the horizontal in all directions, whereby the angle of the bottom of the fish container generally defines the downwardly-projecting cone. The conical shaped bottom of fish container 24B extends upwardly, for example, about 10 inches from the lowest reach of the bottom to the bottom extremity of sidewall 72.

Fish pond 10 preferably has a depth of at least 7 inches, and not greater than 12 inches, at a boundary between central region 25 and outer zone 26 propinquant the top of fish container 24B. Where the greatest overall depth of fish container 24B is 40 inches, the greatest overall depth of fishing pond 10 is thus at least about 47 inches, and up to about 52 inches, at the center of the fish container. The greatest overall depth of water in any one pond, typically in the respective fish container, is between about 42 inches and about 52 inches, from the surface of the water to the downwardly-extending apex of the conical bottom of the fish container. While the greatest overall depth of fish pond 10 may be as little as 42 inches, a preferred greatest overall depth is at least 47 inches.

Each fish pond generally has only a single fish container because fish tend to congregate at the deepest location. If multiple fish containers are used in a single pond, fish might utilize the containers unequally. Thus, fish might be located in only one or two containers out of four, or there might be very different populations of fish in some fish containers than in others. Thus, the person fishing in a less populated container, or in an unpopulated container, would be disappointed by his/her lack of success in catching fish. That same person might well observe other patrons fishing in other containers in the same fish pond having greater success. What the unsuccessful patron would likely not know would be that he/she is fishing in an empty or sparsely populated fish container.

While one embodiment of fish container 24 is shown, other embodiments having elliptical and other shapes can also function properly. The conical, or otherwise downwardly-disposed bottom of fish container 24, however, has an advantage over other shapes or designs, and is thus preferred. Namely, the conical shaped bottom concentrates fish wastes in a central region, facilitating removal by drain 74 located at the bottom of fish container 24B as shown in FIG. 2.

A recirculation transport assembly includes drain 74 secured to filter drain apparatus 76 as shown in FIG. 2. Drain 74 can comprise, for example, a venturi kit adapted for use with a 2 inch inner pipe and a 4 inch outer pipe surrounding the inside pipe. The recirculation transport assembly further includes flexible pipe 85, elbow pipe 86, manifold collection pipe 38, pump 42, and discharge pipe 44.

Figure 3:
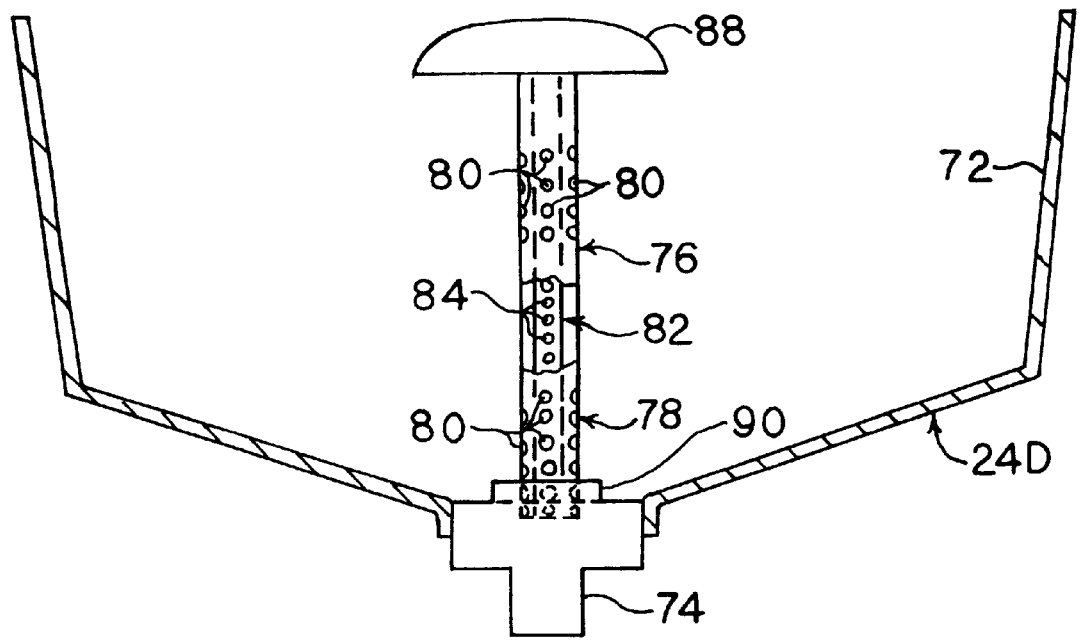
FIG. 3 shows a representative cut-away side view of a fish container subassembly of the invention including a partially cut-away view of filter drain apparatus of the invention.

FIG. 3 better illustrates filter drain apparatus 76. Filter drain apparatus 76 includes a first outer filter drain pipe 78 having apertures 80 at a bottom portion and an upper portion, and a generally unapertured central portion between the apertured top and bottom portions, as shown in FIG. 3. Apertures 80 preferably have diameters of about 7/16 inch. First outer filter drain pipe 78 preferably comprises acrylonitrile butadiene styrene (ABS) or other solid plastic material having a diameter of about 4 inches. Outer filter drain pipe 78 preferably is black because the drain pipe cannot be easily seen by persons about the respective fish ponds. First outer filter drain pipe 78 generally prevents fish, leaves, and other debris from entering filter drain apparatus 76.

Filter drain apparatus 76 further includes a second inner filter drain pipe 82, mounted inside first outer filter drain pipe 78. Second inner filter drain pipe 82 generally has apertures extending along the entire length of the pipe. FIG. 3 has a partial cut-away view showing apertures 84 of second inner filter drain pipe 82. Apertures 84 preferably have circular shapes, and diameters of about 3/16 inch. Thus second inner filter drain pipe 82 acts as a low density solids filter keeping larger suspended objects out of the water recirculation system and pump 42. Second inner filter drain pipe 82 preferably comprises polyvinyl chloride (PVC) or other plastic material suitable for use in water.

Even though filter drain apparatus 76 has the appearance of a stand pipe drain, the apparatus operates differently because of the flow control provided at valves 40 and pump 42. Filter drain apparatus 76 does not control water level like a standard standpipe. The main purpose of filter drain apparatus 76 is to provide circulation and filtering of water. Water and fish waste generally enters filter drain apparatus 76 through apertures 80 near the bottom of first outer filter drain pipe 78 because of the greater water pressure at the lower level. The water then passes through apertures 84 of second inner filter drain pipe 82. If lower apertures 80 plug on first outer filter drain pipe 78, water enters through apertures 80 on the upper portion of the first outer filter drain pipe.

Both filter drain pipes 78, 82 are mounted to drain 74, preferably by frictional engagement. In other embodiments, drain pipes 78, 82 can be threaded for securement to drain 74, through corresponding threads in drain 74. Drain 74 has a drain opening (not shown) within the diameter of second inner filter drain pipe 82 to permit water including small particles of solid waste, to pass therethrough and to enter flexible pipe 85. Flexible pipe 85 connects to elbow pipe 86 as suggested by FIG. 2.

Filter drain apparatus 76 includes a hook guard cover 88 which is preferably a fiberglass-reinforced plastic, and which covers filter drain pipes 78 and 82. Hook guard cover 88 prevents patrons from snagging filter drain pipes 78, 82 when fishing.

Filter drain apparatus 76, including hook guard cover 88, provides structure at central region 25 of each of the respective fish ponds. This structure attracts and retains fish in central region 25 of the pond. Filter drain apparatus 76, including hook guard cover 88, generally extends upwardly to a height substantially even with the top rim of fish container 24B. In this manner, hook guard cover 88 of filter drain apparatus 76 provides cover for fish at the top rim and substantially in the center of fish container 24B.

Solids guard 90 (FIG. 3) comprises an upstanding elongated ring-shaped element extending about the base of filter drain apparatus 76. Solids guard 90 preferably has a height of about 3 inches and an outer diameter of about 6 inches. Solids guard 90 can comprise polyvinyl chloride (PVC) or other plastic material. Solids guard 90 prevents larger debris, such as bones and cones, from entering first filter drain pipe 78 of filter drain apparatus 76, or from getting close enough to pipe 78 to block apertures 80 at the base of the pipe.

Water and wastes exit filter drain apparatus 76 to flexible pipe 85. Flexible pipe 85 then passes water and wastes to elbow pipe 86. The water and wastes then enter buried recirculation pipe 36B connected to elbow pipe 86. Recirculation pipe 36B preferably comprises a flexible plastic material. Selecting flexible plastic material for recirculation pipe 36B decreases the likelihood of the pipe developing cracks or breaks caused by stress due to shifting of underlying earth 96.

Flexible pipe 85 comprises a flexible plastic such as polyvinyl chloride (PVC). Flexible pipe 85 is required because, after installation, fish container 24B can settle a distance of over 2 inches. Settling occurs, in part, because of the weight of water placed in fish container 24B. Flexible pipe 85 flexes and thus prevents breaking and/or leaking of elbow pipe 86 or recirculation pipe 36B due to settling.

A stress relief element (e.g. pipe protector unit 92) is illustrated below fish container 24B, protecting elbow pipe 86 from stresses related to e.g. settling of the fish container. Sand 94, shown in FIG. 2, provides a sand base for receiving fish container 24B and pond liner 16B. If underlying earth 96 or sand 94 should shift, pipe protector unit 92 protects elbow pipe 86 against at least some of the related stress, and thereby reduces the risk of leakage or breakage of pipe 86. Pipe protector unit 92 can comprise a plastic container or other structure having an opening allowing flexible recirculation pipe 36B to enter therein for securement to elbow pipe 86. Pipe protector unit 92 preferably comprises polyvinyl chloride (PVC).

The opening where recirculation pipe 36D extends through pipe protector unit 92 can be covered by a rubber material having slits. Such an arrangement keeps earth and sand out of pipe protector unit 92, but allows an installer access to secure elbow pipe 86 to flexible pipe 85 and to recirculation pipe 36D.

Returning now to FIG. 1, flexible buried recirculation pipe 36A is connected via valve 40A to above ground manifold collection pipe 38. Likewise, recirculation pipes 36B–36D are connected via respective valves 40B–40D to manifold collection pipe 38. In this manner, water and fish wastes from all respective fish containers is collected and removed from the water, and the water recirculated. Since filter drain apparatus 76 is mounted generally at the bottom of fish container 24, most fish waste solids readily enter the recirculation transport assembly for ongoing cleaning of water in the fish pond system.

Assuming the proper valve 40A–40D is open, recirculation pump 42 pumps water and suspended fish waste solids from respective selected ponds 10, 12, 20, and/or 22, through discharge pipe 44 toward settling pond 46.

Flow meters (not shown) can be provided for any or all of recirculation pipes 36A–36D, manifold collection pipe 38, or discharge pipe 44, which flow meters can assist an operator in determining which valves should be further opened or closed for best operation of pond system 8.

Pipes 38, 44 can comprise PVC, other plastics, or metal. Pipes 38, 44 preferably have diameters of 1.5 inches or more. While recirculation pipes 36A–36D are buried for proper gravity flow toward manifold pipe 38, pipes 38 and 44 may either or both be either above or below the surface of the ground. If pipe 38 is above ground, then upstanding connecting pipes, not shown, are used to connect the respective drain pipes to manifold collection pipe 38.

Recirculation pump 42 can comprise, for example, a 2-speed centrifugal pump, MAGNETEK™ Model No. BN37 made by Pac-Fab, Inc., located in Sanford, N.C. Pump 42 has an operating capacity of from about 30 gallons per minute to about 60 gallons per minute.

Pump 42 pumps water and suspended fish waste solids through discharge pipe 44 to settling pond 46. Fish waste solids tend to settle at deep section 52 of the settling pond, and the thus clarified water returns to e.g. first fish pond 10 via chute 48.

Recirculation pump 42 preferably operates continuously. In warmer weather or depending on other conditions of fish pond system 8, pump 42 can operate at a greater or slower speed, or intermittently, as desired.

Settling pond 46 includes an underlying sheet-like pond liner such as plastic sheet, as described earlier, forming the bottom of the pond. A sand base generally is located under the plastic sheet. A deep section 52 of settling pond 46 contains submersible pump 50. Submersible pump 50 can be a sump type pump that periodically operates to remove fish waste from the bottom of the settling pond. Submersible pump 50 can pump fish waste to a selected one of decomposition ponds 54A–54C via a flexible hose (not shown). While a submersible pump is preferred, the submersibility feature is not required.

Figure 4:
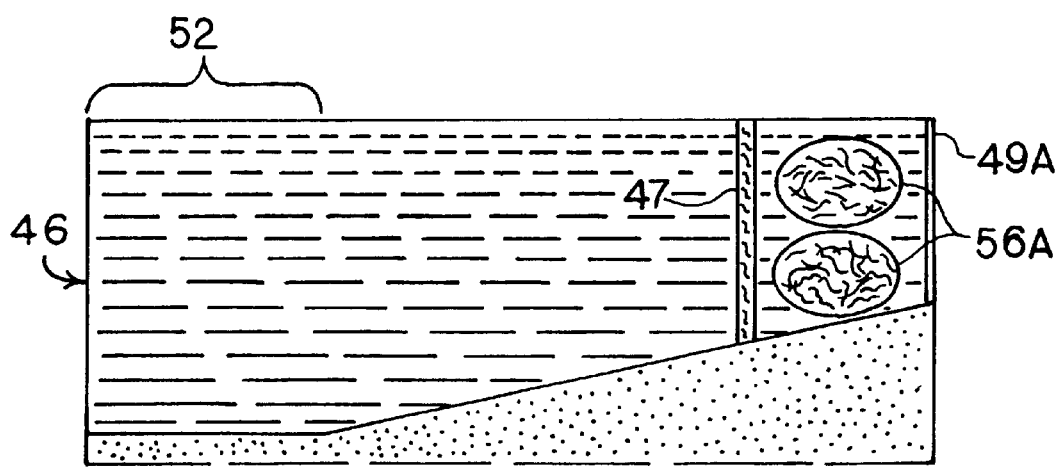
FIG. 4 shows a representative cross section view of a settling pond taken at 4—4 of FIG. 1, with water therein.

The illustrated settling pond 46 has a depth of about four feet at deep section 52 adjacent the inlet end, as shown in FIG. 4. The length of the settling pond 46 is preferably about 8 feet. A preferred width is about 4 feet. The four foot width slows down the velocity of incoming water and fish waste from discharge pipe 44 causing solid fish waste to sink to the bottom at deep section 52. In some embodiments, settling pond 46 includes baffles, tubes, or settling plates to reduce the settling distance of suspended solids, and promote settling thereof. As illustrated in the cross-sectional view of FIG. 4, the depth of settling pond 46 gradually decreases toward the discharge end, such that the depth is about 2 feet where the settling pond discharges the clarified supernatant water into clarifier water chute 48.

Settling pond 46 includes a deeper section 52, typically about 4 feet deep, adjacent the inlet end, and a shallower section, typically about 2 feet deep, adjacent the outlet end. An exemplary settling pond 46 has a width of about 4 feet and a length of about 8 feet, and contains about 600 gallons of water.

Water traversing settling pond 46 passes through coarse filter 47. An exemplary coarse filter is Part No. PFM 3, having a thickness of one inch, manufactured by Stony Creek Equipment Co. of Grant, Mich. Washable and reusable polyester fibers comprise the filter material in coarse filter 47. Filter 47 captures suspended solids or the like. Water then flows through biofilter 56A. Biofilter 56A includes, in general, a comminuted substrate on which bacteria can grow. Such substrate can comprise, for example, shredded plastic (polyvinyl chloride) material (not shown) contained in readily permeable mesh bags. The comminuted plastic substrate material may be elongate strings e.g. about 0.0005 inch to about 0.008 inch thick, and about 0.1 inch to about 0.25 inch wide. An exemplary shredded plastic known as BIO-FIL™ can be purchased from Aquatic Ecosystems, Inc. of Apopka, Fla. Such shredded plastic substrate provides surfaces suitable for bacterial growth. Clarifier chute 48 typically has a depth of about two feet at the end near settling pond 46 to allow sufficient surface area and volume for the shredded plastic material.

While comminuted plastic substrate material is preferred, other materials can be used for biofilter 56A. For example, plastic balls, plastic beads, oyster shells, or other materials having a large surface area can be utilized as a site for bacteria growth.

As an example, bacteria which may be added to the water, in liquid suspension, for growth in biofilter 56A is BACTA-PUR™ No. BN1A(N3000+) available from Aquatic Ecosystems Inc. of Apopka, Fla. The bacteria can also attach to lava rocks, and to other surfaces which may be incorporated into fish pond system 8 (e.g. for that purpose). These and other bacteria may be utilized to convert ammonia in the water to nitrite and then to nitrate. Bacteria thus assist in keeping fish pond system 8 in proper chemical balance. Bacteria are periodically added, as needed, to fish pond system 8.

Clarifier chute 48 typically has a width of about 4 feet and a length of about 12 feet. The end of clarifier chute 48, adjacent barrier 51A, preferably has a depth of about 10 inches and preferably contains about 500 gallons of water.

Clarifier chute 48 typically is even sloped from end to end. Clarifier chute 48 preferably is formed by a material similar to that described for fish pond liners 16A–16D.

Fine filters 49A–49C in clarifier chute capture smaller solids or the like suspended in the water. An exemplary fine filter is Part No. PFM 1, having a thickness of about ¾ inch, manufactured by Stony Creek Equipment Co. of Grant, Mich. Washable and reusable polyester fibers comprise the filter material in the fine filters 49A–49C. The fibers of fine filters 49A–49C, of course, have smaller diameters than the fibers of coarse filter 47.

Recirculation pump 42 is shut down periodically, and clean water pumped by a portable pump (not shown) from clarifier chute 48, over fish barrier 51A, to fish ponds 10, 12. Then water is added to chute 48 and dechlorinated by a chlorine neutralizer, such as a tap water conditioner made by Aquarium Pharmaceuticals, Inc. of Chalfont, Pa. The conditioner can be added to tap water in clarifier chute 48. After the water has been dechlorinated, recirculation pump 42 is restarted to recirculate water in fish pond system 8. Such an operation can take place every day or two, to replace water lost from pond system 8 due to evaporation.

Submersible pump 50 can periodically be operated to pump waste water containing solids from settling pond 46 into a decomposition pond 54. Such operation can occur twice a week or as often as needed depending on the number of fish, weather conditions, and other factors contributing to the condition of the water.

After pumping occurs, appropriate chemicals can be utilized to clean settling pond 46 of clarifier system 45.

Submersible pump 50 can comprise, for example, Model 2300 made by Simer Pump Company, located in Sedalia, Mo., and may have a capacity of, for example, about 10 gallons per minute.

The invention contemplates preferably pumping fish waste from settling pond 46 to selected ones of decomposition ponds 54A–54C during hours when the fish pond system is closed to patrons. Pumping of fish wastes from settling pond 46 can occur, for example, once a day, once a week, or more or less often, depending on the number of fish, the amount of food provided to the fish, and other conditions of operation of the system which affect the amount of fish waste/excrement produced.

Decomposition ponds 54A–54C receive fish waste and contained water from settling pond 46. Each decomposition pond 54A–54C comprises a decomposition pond liner, and soil placed on the liner. As shown in FIG. 1, decomposition pond 54A includes three zones "55A", "55B", and "55C". Zone 55A comprises a shallow water zone, zone 55B comprises a transitional zone, and zone 55C comprises a generally dry zone. Zone 55C generally is dry, while zone 55A usually contains at least a small amount of water. Decomposition ponds 54A–54C are gently sloped at an upward angle from shallow water zone 55A to generally dry zone 55C.

Zone 55A includes water-tolerant plants, such as bullrush, sedge, spike rush, arrowhead, and cattails. Selected plants grow in the soil, preferably above the liner. The water level at the deepest end of zone 55A preferably is maintained between about 1 inch and about 9 inches.

Transitional zone 55B sometimes has water and sometimes is not covered by water. Transitional zone 55B can include plants such as Iris, Joe-Pye weed, sweet flag, lowland smartweed, reed canary grass, and other plants suitable to the environment.

Zone 55C can include cord grass, nodding smartweed, and other plants suitable to the usually dry environment of the zone.

The above zones of decomposition pond 54A decompose and biologically utilize, and thus recycle, solid fish waste through biological processes, taking up nitrogen, phosphorous, and like nutrients in the plant-growing process.

Other decomposition ponds 54B–54C have similar zones (not illustrated) as at pond 54A. The shape of the decomposition ponds may be varied to fit the surroundings of fish pond system 8. The straight lines in FIG. 1 between adjacent zones are for purposes of illustration only. The transition or break areas between zones vary depending on the amount of water typically in the pond, and the success of plants therein. Thus the zones are generally not divided along a straight line. Transition zone 55B can contain some plants from each of the adjacent zones. Each decomposition pond functions like a wetland, recycling the fish waste. Water in decomposition ponds 54A–54C evaporates into the atmosphere.

In some embodiments, an underground liner may not be necessary under decomposition ponds 54A–54C. For example, where the native underlying soil is a clay or other poorly drained composition, the underlying soil may serve the same function as the described liner, such that no separate liner element need be used as the base of a decomposition pond 54. The liner may be omitted, under similar conditions, in the fish ponds. However, a plastic or other sheet-like liner is preferred, if only as a barrier to burrowing animals which might otherwise make holes in the bottoms of the ponds.

In other less preferred embodiments, the decomposition ponds 54 can be omitted. In such embodiment, the fish waste is pumped into, or otherwise transported to, the local e.g. municipal sanitation system. This method is less preferred because such embodiment of the fish pond system is not a self-sustaining closed system since waste is being sent away from the system (e.g. to the municipal sanitation system) for treatment and/or disposal.

Filtration system 14A includes fish barriers 28A, 28B, aerator 32A, and water plants 34. Filtration system 14A is joined to each of first fish pond 10 and second fish pond 12 at opposing sides of the filtration system. The depths of the water in the ponds and in the filtration system adjacent such joinders is preferably about 6 inches. Thus, recirculated water flows through first fish pond 10, thence through filtration system 14A, and thence into second fish pond 12.

Fish barriers 28A, 30A preferably comprise lava rocks that block fish access to the filtration system. Thus, fish in pond 10 cannot leave pond 10 and thereby move into the filtration system or fish pond 12. Similarly, fish in fish pond 12 cannot leave the fish pond and thereby move into the filtration system or fish pond 10. While lava rock is preferred, other barriers, such as wire screens, can perform the same function of permitting water to pass while preventing fish from passing therethrough. Lava rocks are preferred because of their preferred aesthetic appearance compared to other available barrier materials. Fish barriers 28B, 30B can likewise comprise the same materials, such as lava rock.

Fish barrier 51B comprising lava rocks or the like preferably is constructed at first chute 18 to prevent entry of fish into filtration system 14B. Fish barrier 51A comprising lava rocks or the like preferably is constructed at clarifier chute 48 to prevent entry of fish from first fish pond 10 into settling pond 46. In this manner, fish are retained in the fish ponds. Further, lava rocks can extend along substantial lengths of chutes 18, 48 to provide a uniform and appealing appearance to the overall fishing pond system. The lava rocks further provide a good growing substrate for growth of bacteria that treat wastes in the water, which bacteria are discussed earlier.

More importantly barriers 51A, 51B at chutes 18, 48 provide a waterfall or drop of about 1 foot, respectively. Thus, fish ponds 10, 12 are at a water level about 1 foot below that of clarifier system 45. Fish ponds 20, 22 are at a water level about 1 foot below the water level at fish ponds 10, 12. Thus barriers 51A, 51B effectively comprise dams blocking water, and creating waterfalls. The overall head of pond system 8 is about two feet. As additional ponds are added, the overall head can be increased.

Aerator 32A is positioned between respective fish barriers 28A, 28B. Water depth at aerator 32A is generally at least about 13 inches. Such a water depth can be provided by a tank (not shown) formed in the plastic liner forming the bottom of filtration system 14A. The tank has similar properties, except the dimensions, to fish containers 24. The tank typically is placed in the center of filtration system 14A to provide water depth of at least about 13 inches, or more, so that aerator 32A can operate properly. Screening is preferably placed between aerator 32A and water plants 34 to avoid contact between the aerator and the water plants. When operating, aerator 32A adds oxygen to the water. Typically, aerator 32A has the appearance of a fountain spraying water. In an instance when too much oxygen is present in fish ponds 10, 12, aerator 32A can blow off oxygen by spraying the water. Aerator 32A can also be utilized to increase warming of water in fish ponds 10, 12 by spraying the water during the day or at a time when the ambient air is warmer than the water. Aerator 32A can also increase cooling of water in the respective fish ponds 10, 12 by spraying the water during the evening or at a time when the ambient air temperature is lower than the water temperature.

One useful aerator comprises the LITTLE TITAN™ 1/6 HP aerator made by Otterbine/Barebo, Inc. of Emmaus, Pa. Such aerator can spray about 99 gallons of water per minute at a height of about 2 feet and about a diameter of about 3 feet.

Oxygen should be maintained from about 5 parts per million to saturation. An optimum oxygen level is about 9–10 parts per million. Aerators 32A, 32B are selectively operated to assist in maintaining oxygen content at the proper level.

Water plants 34 have an important function in filtration system 14A. Water plants 34 are located between first and second fish barriers 28A, 28B. Water plants 34 effectively absorb dissolved nutrients, such as nitrates and phosphates, from the water and thereby stabilize nitrate and phosphate content of fish pond system 8. The desired levels of nutrients prevent phytoplankton blooms, i.e. green water. Thus water plants 34 keep nitrates and phosphates at desirable levels for maintaining a healthy population of fish. Exemplary water plants 34 include water lettuce and water hyacinth. Other water plants can also be used to control the content of nitrates and phosphates in the circulating water of fish pond system 8. Water plants 34 float above water in the fish pond system and provide shading which maintains the water temperature at a cooler level. Water plants 34 also provide an improved appearance to fish pond system 8.

Chute 18 includes a biofilter 56B. Biofilter 56B includes shredded material contained in readily permeable mesh bags as described earlier with respect to biofilter 56A. Thus biofilter 56B provides surfaces suitable for bacterial growth. First chute 18 typically has a depth of about four feet to allow sufficient surface area and volume for the shredded plastic material. As described earlier, bacteria may be added to the water, in liquid suspension, for growth in biofilter 56B.

In addition to the bacterial treatment, and filtration units 14A, 14B, conventionally known chemical treatments can also be utilized to reduce the likelihood of infection and diseases in the fish.

An additional factor in fish health is water temperature. With respect to the species of fish preferred for use in fish pond systems of the invention, if water temperature is greater than 70 degrees Fahrenheit, the likelihood of disease and infection in fish increases.

Optional chiller unit 98 is shown under bridge 68 in FIG. 1. Chiller unit 98 cools the water to maintain a water temperature of no more than about 70 degrees. An exemplary 1 HP chiller unit is Model No. AE7D made by Aquatic Ecosystems Inc. of Apopka, Fla.

Another optional chiller unit (not shown) can be located at clarifier chute 48. Such a chiller unit preferably is located between fine filters 49A, 49B. This chiller unit has the same purpose, function, and structure as chiller unit 98 described above.

Another approach to cooling the water of fish pond system 8 is to provide as much shading as possible for the water. For example, netting can be erected over the fish ponds to provide shade for the ponds. Shading can be provided on the south side of a fish pond, to minimize heating of the water. Another method of reducing water temperature is to bury pipes 38 and 44 deep enough that the ground temperature around the pipes is less than 70 degrees F., thereby discharging heat to the ground as the water passes through pipes 38, 44.

If, on the other hand, water temperature is less than 60 degrees Fahrenheit, the likelihood of injurious fungus growth on the fish increases, for fish species preferred for use in fish ponds of the invention. Thus, some means, such as a heater, should be provided for maintaining a temperature of at least 60 degrees for water in fish pond system 8 during operation thereof. The preferred range for water temperature is thus between about 60 degrees and about 70 degrees Fahrenheit, most preferably about 65 degrees.

If other species of fish are used, the minimum and maximum desirable water temperatures change accordingly. As in the illustrated embodiments, suitable heating and/or cooling equipment is selected, for controlling water temperature within the preferred range of temperatures.

Evapotranspiration of water from the ponds, chutes, filtration system, etc., requires the introduction of additional water into fish pond system 8. In such instance, tap water or city water includes chlorine. Thus a chlorine neutralizer, as described earlier, can be utilized as needed. In one embodiment, the conditioner can be added to tap water in a storage tank (not shown) and released to fish pond system 8 as needed. Thus can water level in fish pond system 8 be maintained.

Clarifier chute 48, preferably between fine filters 49B, 49C can be used to store cages with fish for emergency stocking. Clarifier chute 48 can also contain submerged oxygenating plants such as coontail. When submerged plants release oxygen, the oxygen is retained in the water. Thus submerged plants can assist in maintaining oxygen in the water of the pond system 8 at an acceptable level.

Structural elements not directly related to operation of fish pond system 8 are shown in FIG. 1. For example, office 60 allows an operator to collect money and send patrons to selected fish-catching pads.

Walkways 62A–62F allow patrons to walk to selected fishing pads 64A–64P. The walkways can be made of cement, asphalt, or the like. Bridge 68 allows patrons to cross chute 18.

Selected fishing pads 64A–64P can also be made of cement, asphalt, or the like. It is preferred, however, that fishing pads 64A–64P have a walking and standing surface made from comminuted bark having a typical size of about 1–2 inches. The bark minimizes injury to fish that land on the pad when caught by a patron. The bark does not scale the fish as much as sand tends to. Bark removes less slime from a fish than a concrete surface. Further, the bark tends to be cooler in summer than sand or concrete. Thus bark is a preferred material for fishing pads 64A–64P.

The invention optionally includes a fish bath tray 100 shown in FIG. 1, at fishing pads 64A–64D about fish pond 10. Bath tray 100 provides a healthy environment for caught fish placed therein while being unhooked. Bath tray 100 has a high quality polyester filter fluff substance therein, for example FILTER FLOSS™, available from That Fish Place Company, Lancaster, Pa., and may include a mild salt water solution such that caught fish generally are not harmed before removal of the hook and release of the fish. STRESS COAT™ by Aquarium Pharmaceuticals, Inc. of Chalfont, Pa., can be used for the solution in bath tray 100. The active ingredients in STRESS COAT™ are sodium thiosulfate and aloe vera.

In some embodiments, fish bath trays 100 are surrounded by Spanish moss (not shown). The Spanish moss typically will be located in all areas of fishing pads 64A–64D within one or two feet of fish bath trays 100. The Spanish moss is even softer than tree bark. While the Spanish moss is not as durable as bark, the moss provides a softer surface for landed fish that miss the respective bath tray 100.

Optional dividing walls 66A–66H typically comprise fences made of wood, or may be for example shrubbery. Landscaping can also provide adequate separation and privacy by selection of proper plants. Dividing walls 66A–66H allow patrons in adjacent fishing pads to fish in a relatively uncrowded environment without interfering with each other.

Fence 69 preferably surrounds the fish pond amusement park to prevent patrons from walking in without first paying to use the park.

FIG. 2 illustrates timbers 102A, 102B supporting fish pond liner 16B at the outer edge thereof. Fish pond liner 16B is braced between timbers 102A, 102B and secured thereto. Timbers 102A, 102B also provide a base for patrons to stand on adjacent the fish pond. Timbers 102A preferably have a width of about 6 inches and a thickness of about 6 inches. Timbers 102B placed atop timbers 102A, with pond liner 16B, therebetween, preferably have a width of about 6 inches and a height or thickness of about 3 inches. At least a portion of the timbers is above the water level of the pond. Pond liner 16B can also be fastened or otherwise secured to timbers 102A, 102B.

Many species of fish are suitable for use in fish pond system 8. Generally, predator fish such as pike have dangerous teeth and should not be used. Further, spiny fish, such as bullheads, will not survive as well in close proximity to one another as other fish and the poisonous spines are hazardous for children. Exemplary fish for use in fish pond system 8 are chubs, such as the northern creek chub and the horny head chub. Examples of other fish which may be used are perch and hybrid bluegills. Size of fish to be stocked in the pond is selected for public acceptance as catchable fish, and the fish are fed only enough food to maintain the appropriate size. The fish are not fed a quantity of food that would cause significant growth of the fish. Rather, the quantity of food fed to the fish is controlled such that the fish have sufficient nutrition to be healthy, but not so much food that they grow, or that their appetites are satisfied. Thus, the fish are always hungry, and thus inclined to bite readily when bait or lure is placed near the fish.

References herein and in the claims which follow to "fish" in a fish pond means desirable fish, suitable for catching for amusement. Typically, such fish are purchased by the owner or operator of the pond, and are placed in the pond for the purpose of attracting patrons to the pond for fish-catching amusement.

Applicants acknowledge that some species of fish prefer shallower water, and thus can be found in relatively shallower water. However, none of the species contemplated herein for placement in the ponds and for catching from the ponds prefer shallower water. All such species will seek out water deeper than the water in outer zone 26, when such deeper water is available.

Thus, "fish" in a fish pond does not include fish incidentally placed by nature, such as fish eggs dropped by birds, and the like. Specifically, a pond operated for an extended period of time as discussed herein may contain fish species not selected, or placed in the pond, by the operator of the pond.

Further, while not preferred, the operator of the pond may place in the pond decorative or colorful fish, or other fish which are not intended to be caught, and which fish prefer, and loiter in, shallow water such as in outer zone 26. All such fish are not included in the term "fish" as applied to fish in the pond.

Each fish pond 10, 12, 20, 22, when sized as described herein, can support at least 200 fish of the size of about 6 inches length in the respective fish container. Thus each single fish container 24A–24D can contain from about 200 to about 400 fish. Fish farming would require a larger number of fish in each pond in order to satisfy profit-driven motives based on the overall area occupied by a respective pond.

Outer zone 26 is generally quite shallow, having a depth at outer edge 27 of about 2 inches to about 5 inches of water, and gradually increasing in depth toward fish container 24B, where the depth at the juncture of outer zone 26 and the top of fish container 24B is about 7 inches to about 12 inches of water.

Since outer zone 26 is shallow, and since many species of fish prefer water deeper than 7 inches to 12 inches, any fish in outer zone 26 tend to move toward deeper water, thus toward fish containers 24; and when they reach fish containers 24, tend to stay in the fish containers because of the greater depth. Shallow areas of the fish pond are devoid of cover, such as weeds, shade, etc. Therefore, fish are attracted to fish container 24 and filter drain apparatus 76. Thus, the overall length and width of any given pond is generally devoid of fish, with a high concentration of fish in the respective fish containers 24 at central zones 25.

From the above given overall pond dimensions, and the dimensions of the fish container, it is seen that the surface area of the pond underlain by fish container 24, and wherein substantially all the fish are located, comprises no more than about 20% of the overall surface area of the pond. In preferred ponds, the surface area of the pond underlain by fish container 24, and wherein substantially all the fish are located, comprises from about 4% to about 16%, more preferably from about 6% to about 12%, and even more preferably about 8% to about 10%, of the overall surface area of the pond.

Thus the pond is intentionally designed and built so as to employ pond structure causing the fish to concentrate in a small fraction of the pond, thereby to leave the remainder of the pond substantially devoid of fish. The overall affect is a body of water having the appearance of a fishing pond, but wherein the fish are suitably and predictably concentrated by the design of the pond and in cooperation with the natural instincts of the fish to seek deeper water during daylight than the depth in shallower outer zone 26, such that a patron can be assured of presenting his/her bait to a relatively large number of fish.

For use as a live fish catching game, fish pond system 8 operates as a fish pond amusement park. For example, in FIG. 1, fish catching pads 64A–64D are about equidistantly spaced from fish container 24A. A single fishing pole is contemplated at each pad 64A–64D. Thus, when in use, patrons at each pad in the illustrated embodiment reach the respective fishing pole about the same distance beyond edge 27, out into the pond, in order to drop the hook into fish container 24A, where the fish are congregated. It is contemplated that smaller children will generally fish with the assistance of an older child or an adult.

In an exemplary embodiment, the fishing poles are cane poles, all having similar pole length and similar lengths of fishing line. The fishing poles are so sized and equipped to permit each patron to reach out and drop his/her fishing line into fish container 24A without snagging another patron, or crossing lines or poles with another patron. Thus, patrons on adjoining pads can fish in a common fish container in the same pond, without interfering with one another.

Bait can comprise an artificial jig or the like, preferably having a barbless hook. The barbless hook increases the ease of releasing and returning fish to fish pond 10, and the likelihood of avoiding fatal injury to the fish. While jigs or other artificial baits having barbless hooks are preferred, live bait such as earthworms or the like is also acceptable.

When a patron catches a fish, he/she places the fish in bath tray 100, removes the barbless hook, and then releases the fish. In this way, less stress is placed on the fish than if the fish were placed on the ground, even on the bark pads, or if the fish were held in the air.

In preferred embodiments, all fish should be returned to fish pond 10 and not eaten for food. This policy of not allowing the fish to be eaten as food permits the use of chemicals to treat the fish to maintain their health. This also reduces the need to replace fish as often.

The invention contemplates a wide variety of layouts and geometric arrangements of the ponds and support elements with respect to each other. FIG. 1 is exemplary only. Thus, fish ponds 10, 12, 20, 22 can be oriented at different angles and in different directions, orientations, and arrangements not shown in the embodiment of FIG. 1. For example, pond system 8 can comprise a single fish pond 10 and a single filtration system 14A. Pond system 8 can be arranged in any one or a multitude of potential patterns. For example, FIG. 1 shows first chute 18 opening into filtration system 14B. Fish ponds 20, 22 can have the same shape, and can be arranged in the same orientation, as fish ponds 10, 12. The layout of FIG. 1 was designed to fit into a confined area. Thus any foreseeable variation of the order, type, or arrangement, of the ponds and support elements of fish pond system 8 is within the scope of the invention. For example, first chute 18 can flow into third pond 20 or fourth pond 22, instead of into filtration system 14B. The motivation behind the design of FIG. 1 is to maximize utilization of valuable real estate space in laying out the third and fourth fish ponds 20, 22.

The fish pond system of the invention preferably includes a control module, providing real-time automatic control of operation of the system. The control module controls, for example, water temperature, whether heating or cooling; oxygen level, such as through operation of aerators 32A, 32B; water circulation rate such as by control of valves 40A–40D and pump 42; addition of water to the system; addition of chemicals to the water; and timing and direction of discharge of settled solids from the settling pond to a selected one of the decomposition ponds. Other elements of the fish pond system may also be similarly controlled by the control module.

The control module comprises suitable sensors placed at suitable locations about the fish pond system, a computer controller, and suitable activation elements effecting the various actions as directed by the computer controller.

The ponds illustrated herein have deeper regions 25 located centrally in the ponds, with outer zones 26 extending outwardly from about the entireties of the perimeters of the central regions. In other, less preferred embodiments, the deeper regions may be located away from the central region of the pond, indeed may be adjacent an edge 27. In such embodiment, outer zone 26 extends outwardly away from the deeper region as appropriate to the edge 27. The common features are maximum depth of the pond in the deeper region, minimum depth of the pond in the outer zone, the preferably constant, though not necessarily constant angle, slope of the outer zone between the deeper region and the edge, the preferred slope of the angle at the bottom of the outer zone. Of course, there is a lack of structure or cover in outer zone 26 giving fish a place to hide.

In such shallow water as is generally maintained in outer zone 26, fish tend to swim toward deeper water to the extent the fish can detect the direction in which to swim in order to reach deeper water. Thus, in general, outer zone 26 should define constantly increasing depth between outer edge 27 and deeper region 25, as such constantly increasing depth serves as a guide, whereby any fish in outer zone 26 tend to swim toward the readily-perceived deeper region 25.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A fish pond for recreational catching of fish, said fish pond containing water, and comprising:

(a) a first deeper region having a relatively deeper maximum depth of water of at least 30 inches;

(b) a second shallower zone having a relatively shallower depth of water of no greater than 12 inches and extending away from said first deeper region;

(c) a pond liner underlying said second shallower zone, and extending away from said first deeper region; and (d) at least one fish container defining said first deeper region, said fish container having a bottom and a top, said fish container being separate and distinct from, and joined to, said pond liner at a joint, and cooperating with said pond liner about said fish container in forming a unitary bottom of said fish pond, said fish container defining the depth of said first region, the deeper depth being sufficiently deep that fish congregate in said fish container.

2. A fish pond as in claim 1, said pond liner having a top surface, said fish pond including a sand base underlying said pond liner, said sand base being shaped to provide, to the top surface of said pond liner, an upward angle measured from said first deeper region and generally extending toward an outer edge of said pond.

3. A fish pond as in claim 2, said second shallower zone having a depth of from at least about 7 inches to no more than about 12 inches, adjacent said fish container.

4. A fish pond as in claim 1, said second shallower zone having a depth of from at least about 7 inches to no more than about 12 inches, adjacent said fish container.

5. A fish pond as in claim 4, said pond liner being inclined at a generally upward angle away from said first deeper region, the generally upward angle defining less than 10 degrees with respect to a horizontal plane.

6. A fish pond as in claim 1, said at least one fish container extending downwardly from the top thereof about 40 inches to the bottom thereof, said fish pond having an overall depth of at least about 42 to about 52 inches at said at least one fish container.

7. A fish pond as in claim 1, the top of said fish container having an open area corresponding to a diameter of from about 72 inches to about 78 inches.

8. A fish pond as in claim 7, the bottom of said fish container having an area corresponding to a diameter of from about 62 inches to about 68 inches.

9. A fish pond as in claim 1, the bottom of said at least one fish container having a conical shape.

10. A fish pond as in claim 9, the conical shape of the bottom of said at least one fish container, from a center of the bottom, corresponding to an angle of about 20 degrees with respect to the horizontal.

11. A fish pond as in claim 10, including a drain located at a lower portion of the bottom of said fish container, said fish container receiving water thereinto, solid exudates from fish collecting at the conical shaped bottom of said at least one fish container.

12. A fish pond as in claim 9, said fish container having side walls extending between said bottom and said top, said conical shaped bottom of said fish container extending downwardly about 10 inches from said side walls, said side walls extending upwardly from said bottom about 30 inches, the top, the bottom, and the side walls, in combination, defining the entire upstanding length of said fish container.

13. A fish pond as in claim 1, said pond liner being inclined at a generally upward angle away from said first deeper region, the generally upward angle defining less than 10 degrees with respect to a horizontal plane.

14. A fish pond as in claim 13, said fish pond having a generally rectangular configuration, the generally rectangular configuration having a length of about 15 feet to about 21 feet and a width of about 12 feet to about 18 feet.

15. A fish pond as in claim 14, the top of said fish container having an open area corresponding to a diameter of from about 72 inches to about 78 inches.

16. A fish pond as in claim 13, said fish pond having a configuration generally represented by an ellipse, the major axis of the ellipse having a length of from about 24 feet to about 35 feet, the minor axis of the ellipse having a length of from about 10 to about 20 feet.

17. A fish pond as in claim 16, the top of said fish container having an open area corresponding to a diameter of from about 72 inches to about 78 inches.

18. A fish pond as in claim 1, said fish pond having a generally rectangular configuration, the generally rectangular configuration having a length of about 15 feet to about 21 feet and a width of about 12 feet to about 18 feet.

19. A fish pond as in claim 1, said fish pond having a configuration generally representing an ellipse, the major axis of the ellipse having a length of from about 24 feet to about 35 feet, the minor axis of the ellipse having a length of from about 10 to about 20 feet.

20. A fish pond as in claim 1, said first deeper region comprising a central region of said fish pond, said central region having a perimeter, said second shallower zone comprising an outer zone surrounding said central region and extending outwardly from the perimeter of said central region.

21. A fish pond as in claim 1 wherein said pond liner is made with cementitious or clay material, the cementitious or clay material being joined to the fish container at the joint.

22. A fish pond as in claim 1 wherein substantially all the fish are located in an area comprising no more than about 20% of an overall surface area of the pond.

23. An outdoor fish pond system for recreational catching of fish, said fish pond system, comprising:
(a) at least one recreational fish pond including (i) a first deeper region having a relatively deeper maximum depth, (ii) a second shallower zone having a relatively shallower depth and extending away from said first deeper region, and (iii) a fish container, having a bottom, in said first deeper region, the fish pond being structured such that the second shallower zone is substantially devoid of fish during daylight levels of light; and
(b) a water recirculation system including a recirculation transport assembly connected in generally liquid-tight liquid communication to the bottom of said fish container, said water recirculation system receiving recirculation water from said fish container, cleaning the water, and returning the cleaned water to said fish pond.

24. A fish pond system as in claim 23, said water recirculation system including a settling pond, the recirculating water passing through said settling pond, solid fish wastes contained in the recirculating water settling out of the recirculating water, in said settling pond.

25. A fish pond system as in claim 24, said settling pond having depth of about 4 feet adjacent a first inlet end thereof and a lesser depth adjacent a second outlet end thereof, the outlet end of said settling pond discharging water for return to said fish pond.

26. A fish pond system as in claim 24, said settling pond having a length of about 15 feet and a width of about 4 feet.

27. A fish pond system as in claim 24, including discharge apparatus adjacent the first inlet end of said settling pond, effective to remove settled waste solids from said settling pond.

28. A fish pond system as in claim 27, including a decomposition pond within said outdoor fish pond system, said discharge apparatus at said settling pond being effective to move waste solids from said settling pond to said decomposition pond.

29. A fish pond system as in claim 28, said decomposition pond having a pond liner, water received in said decomposition pond being disposed of by evapotranspiration, solid waste received in said decomposition pond being disposed of by decomposition and biological utilization.

30. A fish pond system as in claim 29, said decomposition pond including plants growing therein and thereby recycling the fish waste solids through biological processes.

31. A fish pond system as in claim 24, said water recirculation transport assembly defining water-carrying conduit transporting recirculating water from said fish container to said settling pond, said water-carrying conduit being generally limited in size to that necessary to transport the recirculating water from said fish container to said settling pond, and including a pump pumping the recirculating water through the water-carrying conduit to said settling pond.

32. A fish pond system as in claim 24, said water recirculation system including filter drain apparatus connected to the bottom of said fish container, said filter drain apparatus including a first drain pipe having a first set of apertures therein, and a second drain pipe having a second set of apertures therein smaller than the first set of apertures, said second drain pipe being disposed inside said first drain pipe, said filter drain apparatus receiving water including waste solids from said fish container, said first and second sets of apertures preventing large articles of unwanted material, such as leaves, from entering, and thereby reducing the efficiency of, said water recirculation system.

33. A fish pond system as in claim 32, including a solids guard comprising an upstanding ring-shaped element extending upwardly from the bottom of the fish container, about a base of said filter drain apparatus.

34. A fish pond system as in claim 23, including a stress relief element below said fish container, relieving stress otherwise directed to an elbow of said water carrying conduit.

35. A fish pond system as in claim 23, said pond liner extending away from said first deeper region at an upwardly inclined angle, said second shallower zone having a depth of from at least about 7 inches to no more than about 12 inches adjacent said fishing container.

36. A fish pond as in claim 23, said second shallower zone being devoid of structure.

37. A fish pond system as in claim 23, said first deeper region comprising a central region of said fish pond, said central region having a perimeter, said second shallower zone comprising an outer zone surrounding said central region and extending outwardly from the perimeter of said central region.

38. A fish pond for recreational catching of fish, said fish pond containing water, and comprising:
  (a) a first deeper region having a relatively deeper maximum depth of water of at least 30 inches;
  (b) a second shallower zone having a relatively shallower depth of water of no greater than 12 inches and extending away from said first deeper region;
  (c) a pond liner underlying said second shallower zone, and extending away from said first deeper region; and
  (d) at least one fish container in said first deeper region, said fish container having a bottom and a top, said fish container cooperating with said pond liner about said fish container in forming a unitary bottom of said fish pond, said fish container defining the depth of said first region, the deeper depth being sufficiently deep that fish congregate in said fish container,
  the pond structure causing the fish to concentrate in a small fraction of the pond during daylight levels of light.

39. A fish pond as in claim 38, said pond liner having a top surface, said fish pond including a sand base underlying said pond liner, said sand base being shaped to provide, to the top surface of said pond liner, an upward angle measured from said first deeper region and generally extending toward an outer edge of said pond.

40. A fish pond as in claim 39, said second shallower zone having a depth of from at least about 7 inches to no more than about 12 inches, adjacent said fish container.

41. A fish pond as in claim 38, said second shallower zone having a depth of from at least about 7 inches to no more than about 12 inches, adjacent said fish container.

42. A fish pond as in claim 41, said pond liner being inclined at a generally upward angle away from said first deeper region, the generally upward angle defining less than 10 degrees with respect to a horizontal plane.

43. A fish pond as in claim 38, said at least one fish container extending downwardly from the top thereof about 40 inches to the bottom thereof, said fish pond having an overall depth of at least about 42 to about 52 inches at said at least one fish container.

44. A fish pond as in claim 38, the top of said fish container having an open area corresponding to a diameter of from about 72 inches to about 78 inches.

45. A fish pond as in claim 44, the bottom of said fish container having an area corresponding to a diameter of from about 62 inches to about 68 inches.

46. A fish pond as in claim 38, the bottom of said at least one fish container having a conical shape.

47. A fish pond as in claim 46, the conical shape of the bottom of said at least one fish container, from a center of the bottom, corresponding to an angle of about 20 degrees with respect to the horizontal.

48. A fish pond as in claim 47, including a drain located at a lower portion of the bottom of said fish container, said fish container receiving water thereinto, solid exudates from fish collecting at the conical shaped bottom of said at least one fish container.

49. A fish pond as in claim 46, said fish container having side walls extending between said bottom and said top, said conical shaped bottom of said fish container extending downwardly about 10 inches from said side walls, said side walls extending upwardly from said bottom about 30 inches, the top, the bottom, and the side walls, in combination, defining the entire upstanding length of said fish container.

50. A fish pond as in claim 38, said pond liner being inclined at a generally upward angle away from said first deeper region, the generally upward angle defining less than 10 degrees with respect to a horizontal plane.

51. A fish pond as in claim 50, said fish pond having a generally rectangular configuration, the generally rectangular configuration having a length of about 15 feet to about 21 feet and a width of about 12 feet to about 18 feet.

52. A fish pond as in claim 51, the top of said fish container having an open area corresponding to a diameter of from about 72 inches to about 78 inches.

53. A fish pond as in claim 50, said fish pond having a configuration generally represented by an ellipse, the major axis of the ellipse having a length of from about 24 feet to about 35 feet, the minor axis of the ellipse having a length of from about 10 to about 20 feet.

54. A fish pond as in claim 53, the top of said fish container having an open area corresponding to a diameter of from about 72 inches to about 78 inches.

55. A fish pond as in claim 38, said fish pond having a generally rectangular configuration, the generally rectangular configuration having a length of about 15 feet to about 21 feet and a width of about 12 feet to about 18 feet.

56. A fish pond as in claim 38, said fish pond having a configuration generally representing an ellipse, the major axis of the ellipse having a length of from about 24 feet to about 35 feet, the minor axis of the ellipse having a length of from about 10 to about 20 feet.

57. A fish pond as in claim 38, said first deeper region comprising a central region of said fish pond, said central region having a perimeter, said second shallower zone comprising an outer zone surrounding said central region and extending outwardly from the perimeter of said central region.

58. A fish pond system as in claim 38, said fish pond system generating substantially no fish waste for off-site transport for disposal or treatment away from said fish pond system.

59. A fish pond system as in claim 38, including a pond liner extending away from said first deeper region and underlying said second shallower zone.

60. A fish pond as in claim 59 wherein said pond liner is made with cementitious or clay material, the cementitious or clay material forming a joint with the fish container.

61. A fish pond as in claim 38 wherein substantially all the fish are located in an area comprising no more than about 20% of an overall surface area of the pond.

* * * * *